United States Patent
Homma et al.

(10) Patent No.: US 9,552,076 B2
(45) Date of Patent: Jan. 24, 2017

(54) INFORMATION PROCESSING APPARATUS, INFORMATION PROCESSING METHOD AND COMPUTER PROGRAM FOR DETERMINING ROTATION OF A DEVICE

(71) Applicant: SONY CORPORATION, Tokyo (JP)

(72) Inventors: Fuminori Homma, Tokyo (JP); Reiko Miyazaki, Tokyo (JP); Shoichiro Moriya, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/527,322

(22) Filed: Oct. 29, 2014

(65) Prior Publication Data

US 2015/0049119 A1  Feb. 19, 2015

Related U.S. Application Data

(63) Continuation of application No. 13/474,128, filed on May 17, 2012, now Pat. No. 8,890,897.

(30) Foreign Application Priority Data

May 27, 2011 (JP) .................. 2011-118572

(51) Int. Cl.
*G06T 3/60* (2006.01)
*G06F 3/02* (2006.01)
*G06F 1/16* (2006.01)

(52) U.S. Cl.
CPC .............. *G06F 3/02* (2013.01); *G06F 1/1622* (2013.01); *G06F 1/1694* (2013.01); *G06T 3/60* (2013.01); *G06F 2200/1637* (2013.01); *G09G 2340/0492* (2013.01); *G09G 2354/00* (2013.01)

(58) Field of Classification Search
CPC ................... G06F 3/04845; G06F 2200/1614; G06F 3/0346; G06T 3/60; G06K 9/3208; G09G 2340/0492
See application file for complete search history.

(56) References Cited

U.S. PATENT DOCUMENTS

| | | | |
|---|---|---|---|
| 8,217,964 B2* | 7/2012 | Laine | G06F 1/1626 345/659 |
| 8,427,427 B2 | 4/2013 | Kim | |
| 2008/0129666 A1 | 6/2008 | Shimotono et al. | |
| 2010/0214216 A1* | 8/2010 | Nasiri et al. | 345/158 |
| 2010/0283860 A1* | 11/2010 | Nader | 348/222.1 |
| 2010/0302278 A1 | 12/2010 | Shaffer et al. | |
| 2011/0057953 A1 | 3/2011 | Horodezky | |
| 2011/0249078 A1* | 10/2011 | Abuan | H04N 7/147 348/14.02 |

* cited by examiner

*Primary Examiner* — Jacinta M Crawford
*Assistant Examiner* — Diane Wills
(74) *Attorney, Agent, or Firm* — Paratus Law Group, PLLC

(57) ABSTRACT

An information processing device is disclosed. The information processing device includes an inclination detection unit configured to generate a first signal regarding inclination of the device. The information processing device also includes a display processing unit configured to, based on the first signal, generate a second signal to initiate a change in orientation of a display of content, and generate a third signal to cancel the change in orientation in response to receipt of a CANCEL command after initiation of the change.

11 Claims, 16 Drawing Sheets

FIG.8
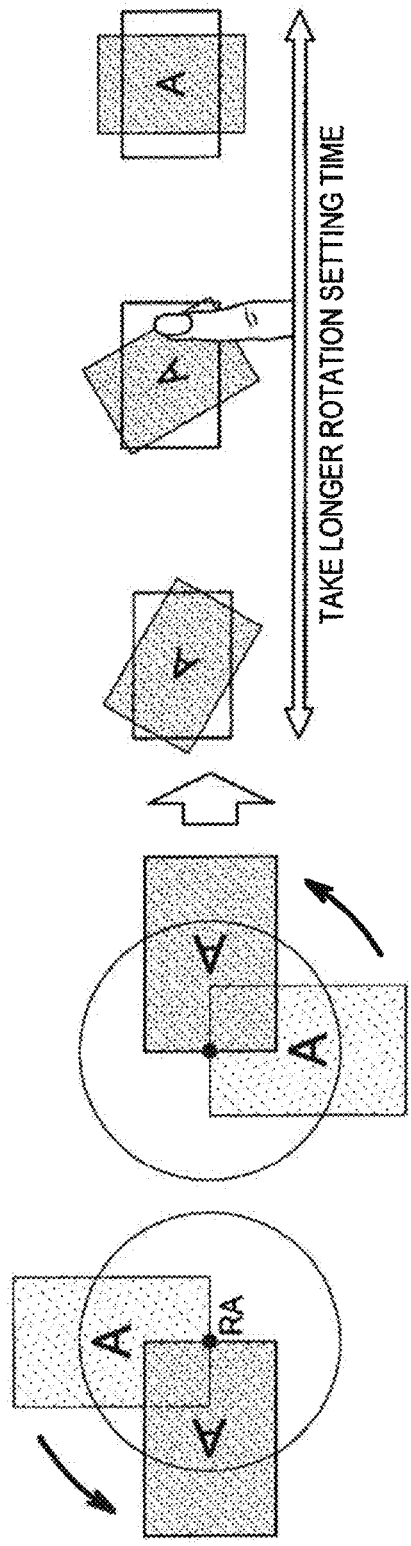
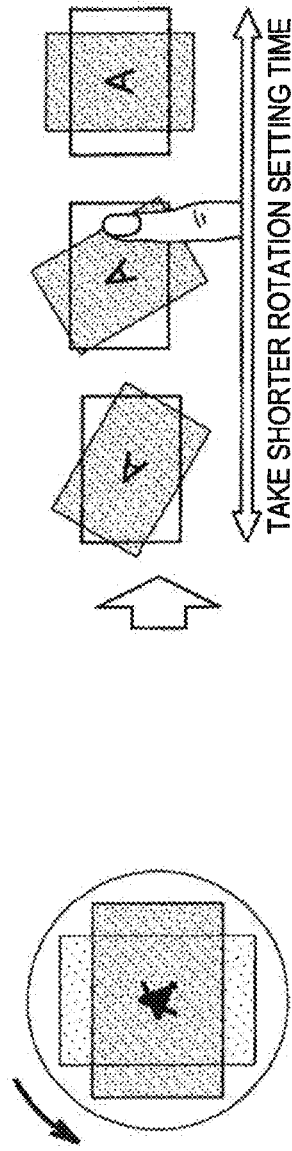

FIG.10
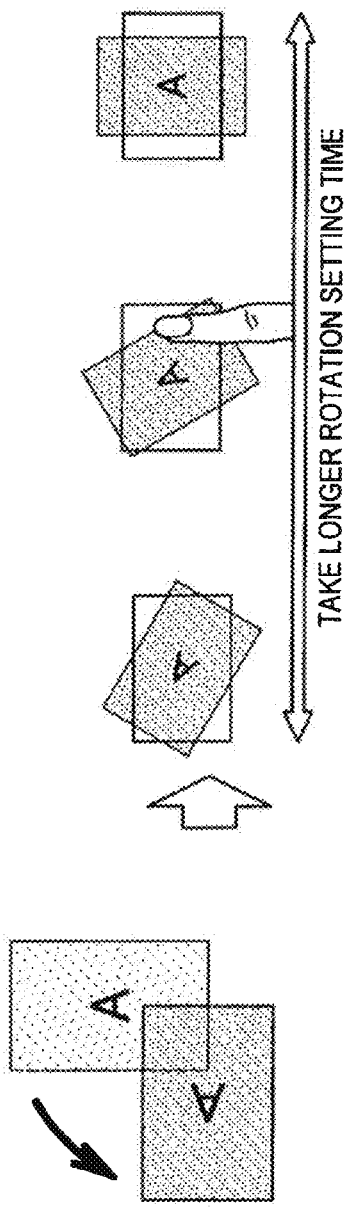
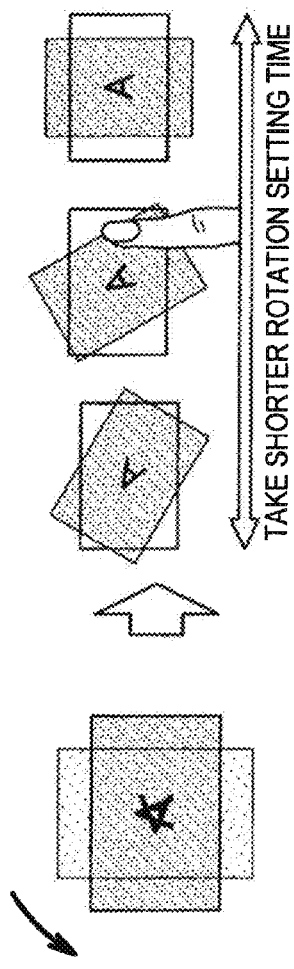

INFORMATION PROCESSING APPARATUS, INFORMATION PROCESSING METHOD AND COMPUTER PROGRAM FOR DETERMINING ROTATION OF A DEVICE

CROSS REFERENCE TO PRIOR APPLICATION

This application is a continuation of U.S. patent application Ser. No. 13/474,128 (filed on May 17, 2012) under 35 U.S.C. §371, which claims priority to Japanese Patent Application No. 2011-118572 (filed on May 27, 2011), which are all hereby incorporated by reference in their entirety.

BACKGROUND

The present disclosure relates to an information processing apparatus, an information processing method and a computer program which can rotate a screen layout depending on a physical rotation of a device.

With a diversification of use of a device, it is demanded to present information to be displayed on a display unit of the device so as to be easily seen by a user depending on how the device is used. For example, a convertible type tablet PC 10 including a display side housing 11 and a body side housing 14 shown in FIG. 13 has a structure in which the display side housing 11 is rotatable by 180 degrees in a state in which the display side housing 11 is opened with respect to the body side housing 14 (see US Patent Application No. 2008/0129666 specification).

The tablet PC 10 can be used as an ordinary notebook PC through an operation for an input unit 15 by causing a surface 11a on the display 12 side in the display side housing 11 to be opposed to the body side housing 14 in a PC use mode (a state (a)). On the other hand, by rotating a coupling unit 13 of the tablet PC 10 (a state (b)) and to fold a back face 11b of the display side housing 11 up so as to be superposed on the body side housing 14 opposite to each other (a state (c)), it is possible to set a tablet use mode (a state (d)). In the tablet use mode, the tablet PC 10 can be used by an operation for a touch panel input unit.

Thus, the tablet PC 10 shown in FIG. 13 can change a direction of the display 12 depending on how a user uses the tablet PC.

In recent years, there is widely used a graphical user interface (GUI) for calculating an inclination of a device based on a result of a detection which is obtained by an acceleration sensor provided on the device and automatically rotating a screen layout to be displayed on a display unit of the device corresponding to the inclination of the device. As an example of the GUI for automatically rotating the screen layout or the like corresponding to the inclination of the device, for instance, FIG. 14 shows the case in which a screen layout of a device 20 is automatically rotated when a rectangular screen provided on the device 20 is vertically long and when the screen is horizontally long.

Referring to the device 20 in FIG. 14, a screen layout A is displayed when it is decided that the device 20 is used with the screen being vertically long, and a screen layout B is displayed when it is decided that the device 20 is used with the screen being horizontally long. It is assumed that the device 20 is used in the vertically long state of the screen of the device 20 and the device 20 is physically rotated in such a manner that the screen is horizontally long in a state in which the screen layout A is displayed on the screen. Consequently, it is decided that the device 20 is used with the screen in the horizontally long state based on a result of a detection obtained by an acceleration sensor, and the display of the screen is automatically changed from the screen layout A to the screen layout B.

Thus, the inclination of the device 20 is detected to automatically change the screen layout. Consequently, it is possible to present information to be easily seen by a user without changing the screen layout by the user.

However, an automatic change in a screen layout corresponding to an inclination of a device shown in FIG. 14 causes deterioration in a convenience in the case in which a user wants to maintain a direction of the screen which is displayed. The inclination of the device 20 is determined based on a gravitational acceleration through an acceleration sensor. For this reason, the screen layout is changed automatically in such a manner that an upper end of the screen layout is typically provided in a reverse direction to gravity.

On the other hand, in a situation in which the user uses the device 20 while changing a posture over a bed as shown in FIG. 15, for example, an inclination of a head portion of the user is changed depending on the posture. For example, when the user is watching the screen in a position on his or her elbows, using palms to support his or her cheeks, in a state in which the device 20 is disposed with the screen set to be vertically long, the head portion of the user is rarely inclined with respect to a direction of the gravity. Accordingly, the user can see information in a screen layout which can easily be seen.

In this state, it is assumed that the user presses the head portion onto the bed with an inclination of approximately 90 degrees with respect to the direction of the gravity, thereby changing the posture. At this time, if the device 20 is also inclined by approximately 90 degrees in order to see information in the screen layout A in the same manner as the situation before the change of the posture, switching from the screen layout A to the screen layout B is automatically carried out corresponding to the inclination of the device 20. For this reason, it is difficult to see the information in a screen layout that the user wants to see. Such situation appears particularly in the case in which the screen layout is greatly varied depending on whether a 2-screen device 30 having two screens 30a and 30b shown in FIG. 16 is turned vertically long or horizontally long.

On the other hand, for example, by providing a hardware button for locking the screen layout to the device, it is possible to offer a function for preventing a change in the screen layout of the device from being carried out. If setting of the hardware button or the like is changed every change in a context to be used by the user, however, the convenience of the device is deteriorated. Therefore, it is desirable that the screen layout can be changed depending on the inclination of the device without the deterioration in the convenience of the device, and furthermore, the screen layout can be changed.

SUMMARY

An information processing device is disclosed. The information processing device includes an inclination detection unit configured to generate a first signal regarding inclination of the device. The information processing device also includes a display processing unit configured to, based on the first signal, generate a second signal to initiate a change in orientation of a display of content, and generate a third signal to cancel the change in orientation in response to receipt of a CANCEL command after initiation of the change.

In another aspect, a method of adjusting a screen orientation of an item of content displayed on an information processing device is disclosed. The method eludes generating a first signal corresponding to inclination of the device, and generating a second signal, based on the first signal, to initiate a change in orientation of a display of the item of content. The method further includes generating a third signal to cancel the change in orientation in response to receipt of a CANCEL command after initiation of the change, and displaying the item of content.

In yet another aspect, anon-transitory computer-readable medium is described. The non-transitory computer-readable medium includes a program for causing a computer to function as a unit for generating a first signal corresponding to inclination of the device, and a unit for generating a second signal, based on the first signal, to initiate a change in orientation of a display of an item of content. The program of the non-transitory computer-readable medium can also cause a computer to function as a unit for generating a third signal to cancel the change in orientation in response to receipt of a CANCEL command after initiation of the change, and a unit for displaying the item of content.

As described above, according to the present disclosure, it is possible to change a screen layout depending on an inclination of a device without deteriorating a convenience of the device, and furthermore, to change the screen layout.

BRIEF DESCRIPTION OF THE DRAWINGS

FIG. 8 is a view for explaining an operation for setting a rotation setting time depending on a rotation axis of the device;

FIG. 10 is a view for explaining an operation for setting a rotation setting time depending on a rotating speed of the device;

DETAILED DESCRIPTION OF THE EMBODIMENTS

Figure 1:
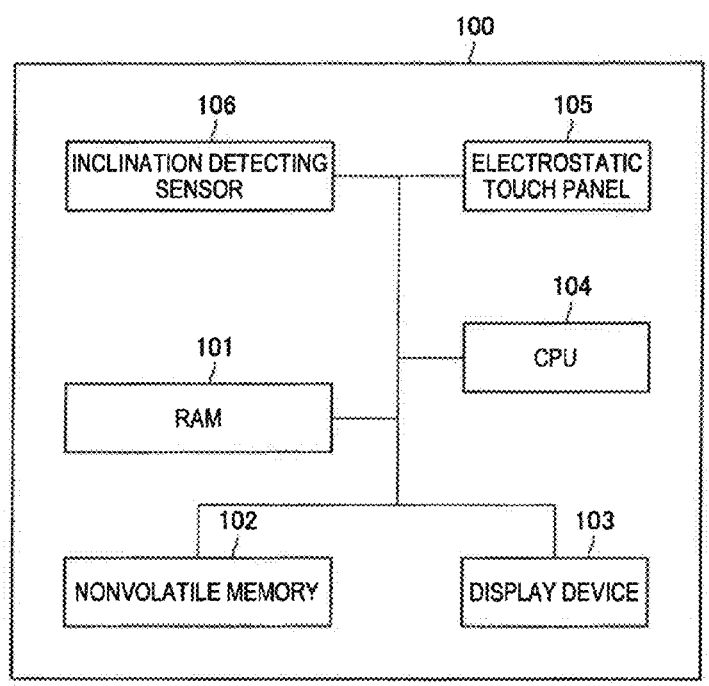
FIG. 1 is a diagram showing an example of a hardware structure of a device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First Embodiment (Detection of only inclination of device)
  1. 1. Summary of Device
  1. 2. Hardware structure
  1. 3. Functional Structure
  1. 4. Screen Layout Change Processing and Cancel Processing thereof
2. Second Embodiment (Detection of Inclination and Angular Velocity in Device)
  2. 1. Summary of Device
  2. 2. Hardware structure
  2. 3. Functional Structure
  2. 4. Regulation of Rotation Setting Time
  2. 5. Screen Layout Change Processing and Cancel Processing thereof <1. First Embodiment>
[1. 1. Summary of Device]

First of all, the summary of a device 100 according to a first embodiment will be described. The device 100 according to the present embodiment is an information processing apparatus which can freely change a way for disposing the device 100, and is a mobile terminal such as a mobile communication terminal, a mobile PC or a tablet terminal. The device 100 includes an inclination detecting unit (the reference numeral 110 in FIG. 2) for detecting an inclination of the device 100 as will be described below, and a display processing unit 120 for carrying out a screen display processing based on a result of the detection obtained by the inclination detecting unit. As used herein, the term "unit" includes a software module, a hardware module, or a combination of a software module and a hardware module. The display processing unit 120 automatically changes a screen layout for information, also referred to herein as "content," which is to be displayed on a display unit (the reference numeral 130 in FIG. 2) depending on the inclination of the device 100 based on the relationship between the state of the device 100 and the direction of a gravity.

Moreover, the display processing unit 120 according to the present embodiment cancels a processing for changing a screen layout when a predetermined operation input is input from a user while the inclination of the device 100 is detected to make a transition from an unchanged screen layout to a changed screen layout. Consequently, a user can permit or cancel the change in the screen layout without deteriorating a convenience of the device 100.

With reference to FIGS. 1 to 4, a structure of the device 100 according to the present embodiment and a function thereof will be described in detail.

<1. 2. Hardware Structure>

First of all, a schematic structure of the device 100 according to the first embodiment of the present disclosure will be described with reference to FIG. 1. FIG. 1 is a diagram showing an example of a hardware structure of the device 100 according to the present embodiment.

As shown in FIG. 1, the device 100 according to the present embodiment includes a memory (that is, non-transitory computer-readable medium), such as random access memory (RAM) 101, a nonvolatile memory 102, a display device 103, a CPU 104, an electrostatic touch panel 105, and an inclination detecting sensor 106.

The RAM 101 temporarily stores a program to be used in an execution of the CPU 104, a parameter to be changed properly in the execution, and the like. These are mutually connected through a host bus constituted by a CPU bus or the like. The nonvolatile memory 102 stores a program, an operation parameter and the like which are to be used by the CPU 104. The nonvolatile memory 102 can use a read only memory (ROM), a flash memory or the like, for example.

The display device 103 is an example of an output device for outputting information. As the display device 103, for example, it is possible to use a liquid crystal display (LCD) device, an organic light emitting diode (OLED) device, or the like. The CPU 104 functions as an arithmetic processing device and a control device, and controls a whole operation in the device 100 in accordance with various programs. Moreover, the CPU 104 may be a microprocessor.

The electrostatic touch panel 105 is provided in a lamination with a display surface of a display device and senses an electrical signal through a static electricity, thereby sensing a contact of an operating member such as a finger. Although the electrostatic touch panel is used in the device 100 according to the present embodiment, a pressure sensitive type touch panel for sensing a change in a pressure to the display surface may be used, thereby sensing a contact of a finger in place of the electrostatic touch panel 105. The inclination detecting sensor 106 serves to detect an inclination of the device 100 in a reference state, and an acceleration sensor or the like can be used, for example.

<1. 3. Functional Structure>

Figure 2:
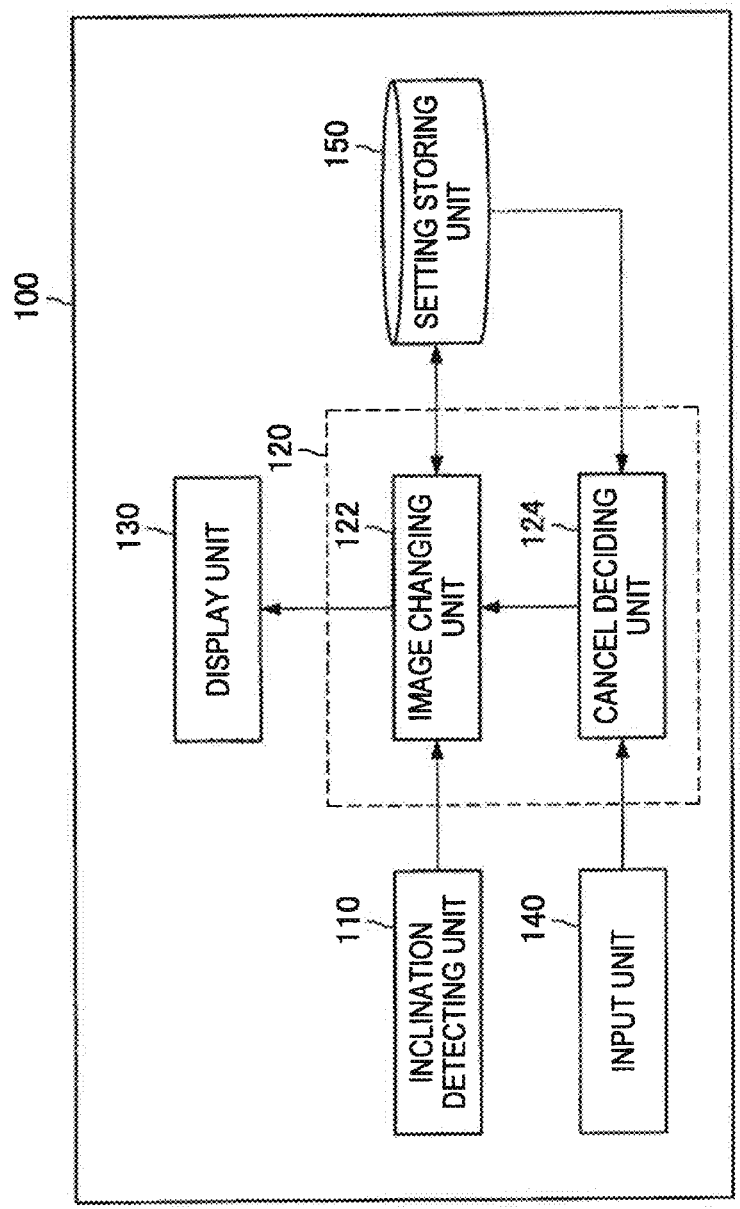
FIG. 2 is a functional block diagram showing a functional structure of the device according to the embodiment.

Next, the functional structure of the device 100 according to the present embodiment will be described with reference to FIG. 2. FIG. 2 is a functional block diagram showing the functional structure of the device 100 according to the present embodiment. FIG. 2 shows only functional sections necessary for changing a screen layout of the display unit 130 and cancelling a screen layout change processing, and the device 100 itself can also include the other functional sections. As shown in FIG. 2, the device 100 according to the present embodiment includes an inclination detecting unit 110, a display processing unit 120, a display unit 130, an inputting unit 140, and a setting storing unit 150.

The inclination detecting unit 110 is configured to generate a signal, referred to herein as a "first signal," regarding inclination of the device. Thus, the inclination detection unit 110 is configured to detect the inclination of the device 100 using the inclination detecting sensor 106 in FIG. 1. The first signal of inclination information of the device 100, which is detected by the inclination detecting unit 110, is output to the display processing unit 120.

The display processing unit 120 is configured to generate a signal, referred to herein as a "second signal," based on the first signal, to initiate a change in orientation of a display of content. The display processing unit 120 is a functional section for changing a screen layout of information to be displayed on the display unit 130, which will be described below, depending on the inclination of the device 100, and includes a screen changing unit 122 and a cancel deciding unit 124. The screen changing unit 122 decides a direction of the device 100 based on the inclination information of the device 100 which is detected by the inclination detecting unit 110 and displays information on the display unit 130 in a preset screen layout with respect to the direction of the device 100. The screen changing unit 122 can acquire setting information about the screen layout depending on the direction of the device 100 from the setting storing unit 150 which will be described below.

The display processing unit 120 is farther configured to generate a signal, referred to herein as a "third signal," to cancel the change in orientation in response to a receipt of a CANCEL command after initiation of the change. The cancel deciding unit 124 cancels a screen layout change processing which is being carried out by the screen changing unit 122 based on an operation input, such as a CANCEL command, from the input unit 140 which will be described below. The cancel deciding unit 124 analyses the operation input from the input unit 140, and outputs an instruction for cancelling the screen layout change processing to the screen changing unit 122 when deciding that the operation input is a cancel operation input, that is, a CANCEL command, for cancelling the screen layout change processing. The instruction output from the cancel deciding unit 124 can be the signal, that is, the third signal. The cancel operation input can be determined at an initialization of the device 100 or can be preset by the user, and can be stored in the setting storing unit 150.

The display unit 130 is an output section for displaying information and corresponds to the display device 103 in FIG. 1. The screen layout of the information to be displayed on the display unit 130 is determined depending on the inclination of the device 100 by means of the screen changing unit 122.

The input unit 140 is a functional section for receiving the operation input from the user, and corresponds to the electrostatic touch panel 105 in FIG. 1, for example. The input unit 140 can also include an input device such as a hardware button in addition to the electrostatic touch panel 105. The operation input from the input unit 140 is output to at least one functional section for carrying out an information processing in the device 100 as operation input information. For example, the input operation from the input unit 140 is output to the cancel deciding unit 124, and the cancel deciding unit 124 analyzes the operation input to decide whether the screen layout change processing to be carried out by the screen changing unit 122 is cancelled or not.

The setting storing unit 150 serves as a storing section for storing necessary information for an information processing in the device 100, and corresponds to the RAM 101 or the nonvolatile memory 102 in FIG. 1. The setting storing unit 150 stores information about a correspondence relationship between the inclination of the device 100 based on the result of the detection which is obtained by the inclination detecting unit 110 and the screen layout of the information to be displayed on the display unit 130, a cancel operation input for cancelling the screen layout change processing and the like, for example. The information to be stored in the setting storing unit 150 may be stored in advance or set by the user.

<1. 4. Screen Layout Change Processing and Cancel Processing Thereof>

Figure 3:
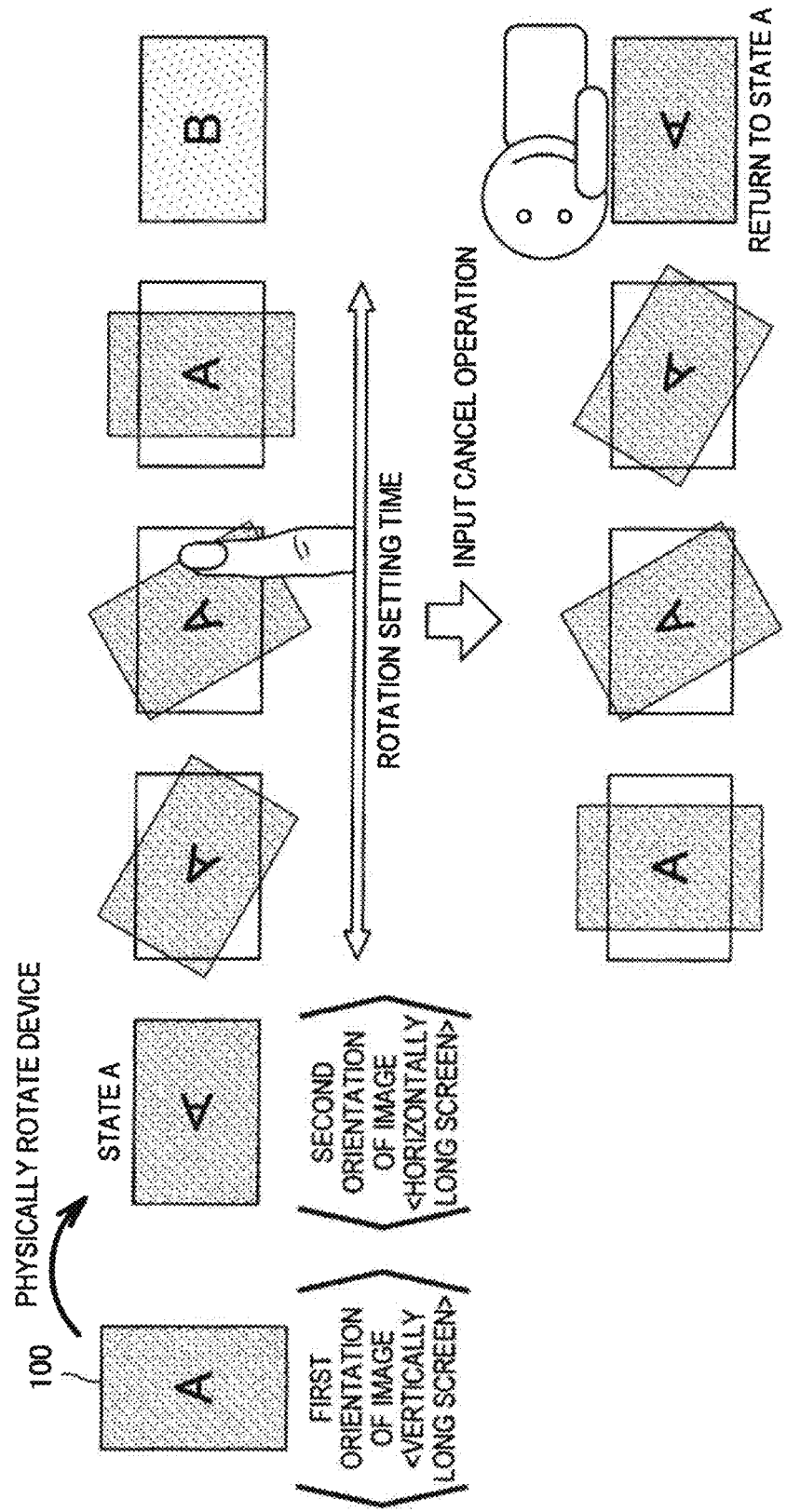
FIG. 3 is an explanatory view showing a screen layout change processing and a cancel processing thereof in the device according to the embodiment.

The inclination of the device 100 according to the present embodiment is detected by the inclination detecting unit 110 and the screen layout of the information to be displayed on the display unit 130 is automatically changed based on the result of the detection which is obtained by the inclination detecting unit 110. For example, as shown in FIG. 3, it is assumed that information is displayed in a screen layout A on the display unit 130 when the screen of the display unit 130 is vertically long (a first direction of a screen), and information is displayed in a screen layout B on the display unit 130 when the screen of the display unit 130 is horizontally long (a second direction of a screen). Herein, when the device 100 is physically rotated and is inclined by 90 degrees from a state in which the screen of the display unit 130 is vertically long to a state in which the screen is horizontally long, information is displayed in the screen layout A on the horizontally long screen as in a state A of FIG. 3 immediately after the device 100 is inclined.

On the other hand, the inclination detecting unit 110 detects that the device 100 is inclined and outputs a result of the detection to the screen changing unit 122. The screen changing unit 122 automatically starts a processing for changing the screen layout based on the result of the detection which is obtained by the inclination detecting unit 110. At this time, in the device 100 according to the present embodiment, a user carries out a cancel operation input, thereby enabling the cancel of the screen layout change processing for a predetermined period until the completion of the screen layout change (which is also referred to as a "changing time" or a "rotation setting time").

The device 100 executes an animation for rotating the screen layout A in a change rotating direction (for example, a clockwise direction) for a screen setting time in such a manner that the screen layout A in the horizontally long state A is subjected to the original vertically long display when the direction of the screen is changed as shown in FIG. 3. Then, the screen changing unit 122 carries out switching into an information display in the screen layout 13 when the screen is horizontally long after the elapse of the screen setting time. On the other hand, when the cancel operation input for cancelling the screen layout change processing is given during the rotation setting time, the screen changing unit 122 cancels the screen layout change processing. Thereafter, the screen changing unit 122 executes an animation for rotating the screen layout A in a reverse direction to the change rotating direction (a counterclockwise direction in FIG. 3), thereby bringing the state A in which the screen layout A is displayed on the horizontally long display unit 130. Consequently, the user can visually recognize information in a screen layout which can easily be seen in such a condition as to press ahead portion onto a bed.

Figure 4:
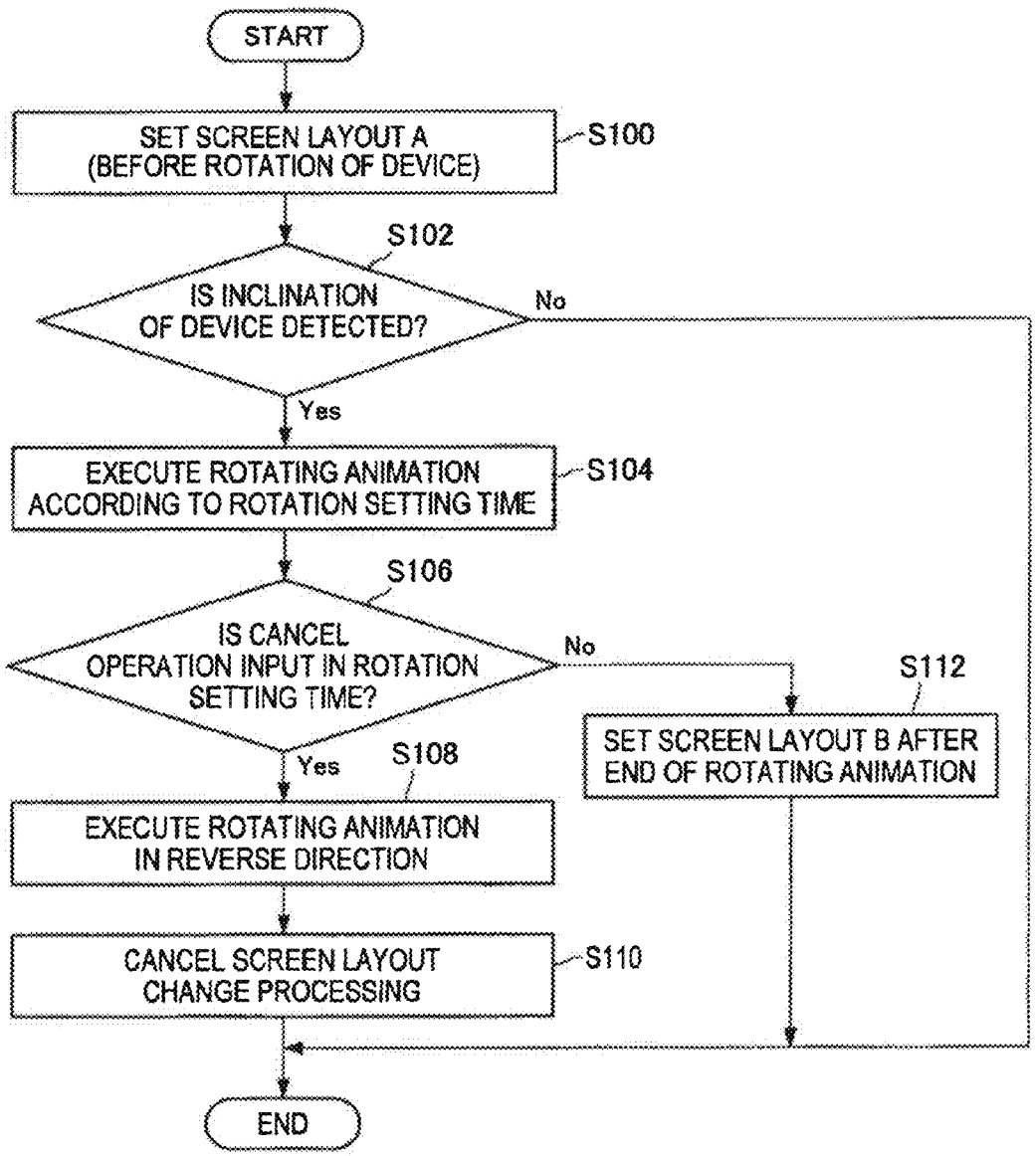
FIG. 4 is a flow chart showing the screen layout change processing and the cancel processing thereof in the device according to the embodiment.

The screen layout change processing and the cancel processing thereof in the device 100 according to the present embodiment will be described below with reference to FIG. 4. FIG. 4 is a flow chart showing the screen layout change processing and the cancel processing thereof in the device 100 according to the present embodiment.

First of all, it is assumed that the information is displayed in the screen layout A when the screen of the display unit 130 has the first direction of the screen as a state brought before the rotation of the device 100 (S100). In the present embodiment, as described above, the information is displayed in the screen layout A with the first direction of the screen (the vertically long screen), and the information is displayed in the screen layout B with the second direction of the screen (the horizontally long screen). This setting is preset to the setting storing unit 150.

Subsequently, the screen changing unit 122 decides the inclination of the device 100 based on the result of the detection which is obtained by the inclination detecting unit 110 (S102). As the inclination detecting unit 110, for example, an acceleration sensor may be used for detecting a gravitational acceleration. At this time, the inclination detecting unit 110 calculates an inclination of the sensor based on a decomposed component of the gravitational acceleration to a reference direction of the sensor. When the inclination of the sensor is calculated, the screen changing unit 122 can acquire the inclination of the device 100 based on the relationship between the device 100 and the direction of the screen of the display unit 130.

The screen changing unit 122 decides the necessity of the change in the screen layout of the display unit 130 based on the inclination of the device 100 which is thus acquired. For example, when an inclination $\theta$ ($0°\leq\theta\leq90°$) of the device 100 is within a range of $\pm\alpha$ (for example, $\alpha=45°$) on the basis of a time that the screen of the display unit 130 in the device 100 is vertically long (that is, $-\alpha\leq\theta\leq\alpha$), the information is displayed in the screen layout A in the vertically long screen. On the other hand, when the inclination $\theta$ of the device 100 is not within the range of $\pm\alpha$ from the reference so that $-90°\leq\theta\leq-\alpha$ or $\alpha\leq\theta\leq90°$ is obtained, the information is displayed in the screen layout B in the horizontally long screen.

When it is decided that a change from the screen layout A to the screen layout B depending on the inclination of the device 100 is not necessary based on the deciding condition, the screen changing unit 122 ends the processing without changing the screen layout and repeats the processing after the Step S100. On the other hand, when it is decided that the change from the screen layout A to the screen layout B depending on the inclination of the device 100 is necessary, the screen changing unit 122 executes a rotating animation of the screen layout corresponding to the rotation setting time (S104).

The rotating animation shows rotation of a screen layout displayed in a different state from a preset state and to rotate the screen layout in a predetermined change rotating direction so as to be displayed in the preset state. For example, as shown in FIG. 3, there is executed a processing for rotating the screen layout A in the change rotating direction to cause the screen layout A to be vertically long in the state A in which the screen layout A to be displayed in the vertically long screen is displayed when the device 100 is disposed to obtain the horizontally long screen. The rotating animation is executed to be completed in the rotation setting time. Consequently, the user can recognize that the screen layout change processing can be cancelled during the execution of the rotating animation.

The rotation setting time is counted after the rotation of the device 100 is detected so that the rotating animation is executed. During the rotation setting time, the user can cancel the screen layout change processing by carrying out a cancel operation input as described above. The cancel deciding unit 124 detects whether the cancel operation input is set from the input unit 140 or not (S106), for example. The cancel operation input can be set to an operation for the user to touch a screen by using an operation member such as a finger or a touch pen, an operation for touching the screen with the operation member to carry out dragging in a reverse direction to the change rotating direction, or the like, The cancel deciding unit 124 outputs, to the screen changing unit 122, an instruction for cancelling the screen layout change processing which is being executed when the cancel operation input is received.

During the rotation setting time, an operation input to an application is blocked to avoid a conflict with an existing operation. The operation input to all of the applications does not need to be blocked but it is sufficient to block at least only operation inputs conflicting with the cancel operation input of the screen layout change processing.

The screen changing unit 122 receiving an instruction for cancelling the screen layout change processing executes a rotating animation in a reverse direction to the change rotating direction in order to give the user a notice of an acceptance of the cancel of the screen layout change processing (S108). Consequently, the screen changing unit reverses the direction of the screen layout A of the rotating animation, thereby bringing the state A in which the screen layout A is displayed on the horizontally long screen as shown in FIG. 3. When the state A is brought, then, the screen layout change processing is cancelled (S110) and the processing of FIG. 4 is thereafter ended, and the processing from the Step S100 is started again.

On the other hand, in the case in which the cancel operation input is not received within the rotation setting time at the Step S106, the screen layout change processing is exactly executed so that the screen changing unit 122 displays information in the screen layout B after the elapse of the rotation setting time, that is, after the end of the rotating animation.

The above description has been given to the structure of the device 100 according to the first embodiment of the present disclosure and the screen layout change processing depending on the inclination of the device 100 and the cancel processing thereof based on the structure. According to the present embodiment, when the screen layout is to be automatically changed depending on the inclination of the device 100, the time (the rotation setting time) is provided until the display change from the unchanged screen layout to the changed screen layout. When the cancel operation input is received in the rotation setting time, the screen changing unit 122 returns the screen layout into the state brought before the screen layout change (the state A in FIG. 3) immediately after the device 100 is inclined.

Consequently, it is possible to usually change the screen layout automatically depending on the inclination of the device 100. Therefore, it is possible to omit a great deal of time and labor for setting the screen layout by the user. On the other hand, in the case in which the user does not demand to change the screen layout, it is possible to easily cancel the screen layout change processing by carrying out the cancel operation input. Accordingly, the user can readily determine the screen layout depending on the configuration of the device 100.

<2. Second Embodiment>

[2. 1. Summary of Device]

Next, the summary of a device 200 according to a second embodiment will be described. The device 200 according to the present embodiment is an information processing apparatus which can freely change a way for disposing the device 200 in the same manner as the device 100 according to the first embodiment. Similarly, the device 200 can freely change a screen layout of information to be displayed on a display section depending on an inclination of the device 200 based on a relationship between astute of the device 200 and a direction of a gravity. During a rotation setting time from the detection of the inclination of the device 200 to a change from an unchanged screen layout to a changed screen layout, moreover, a user can change a screen layout change processing which is being executed by carrying out a cancel operation input. The device 200 according to the present embodiment is different from the device 100 according to the first embodiment in that a situation in which the device 200 is rotated is analyzed to set a rotation setting time depending on a result of the analysis.

Figure 5:
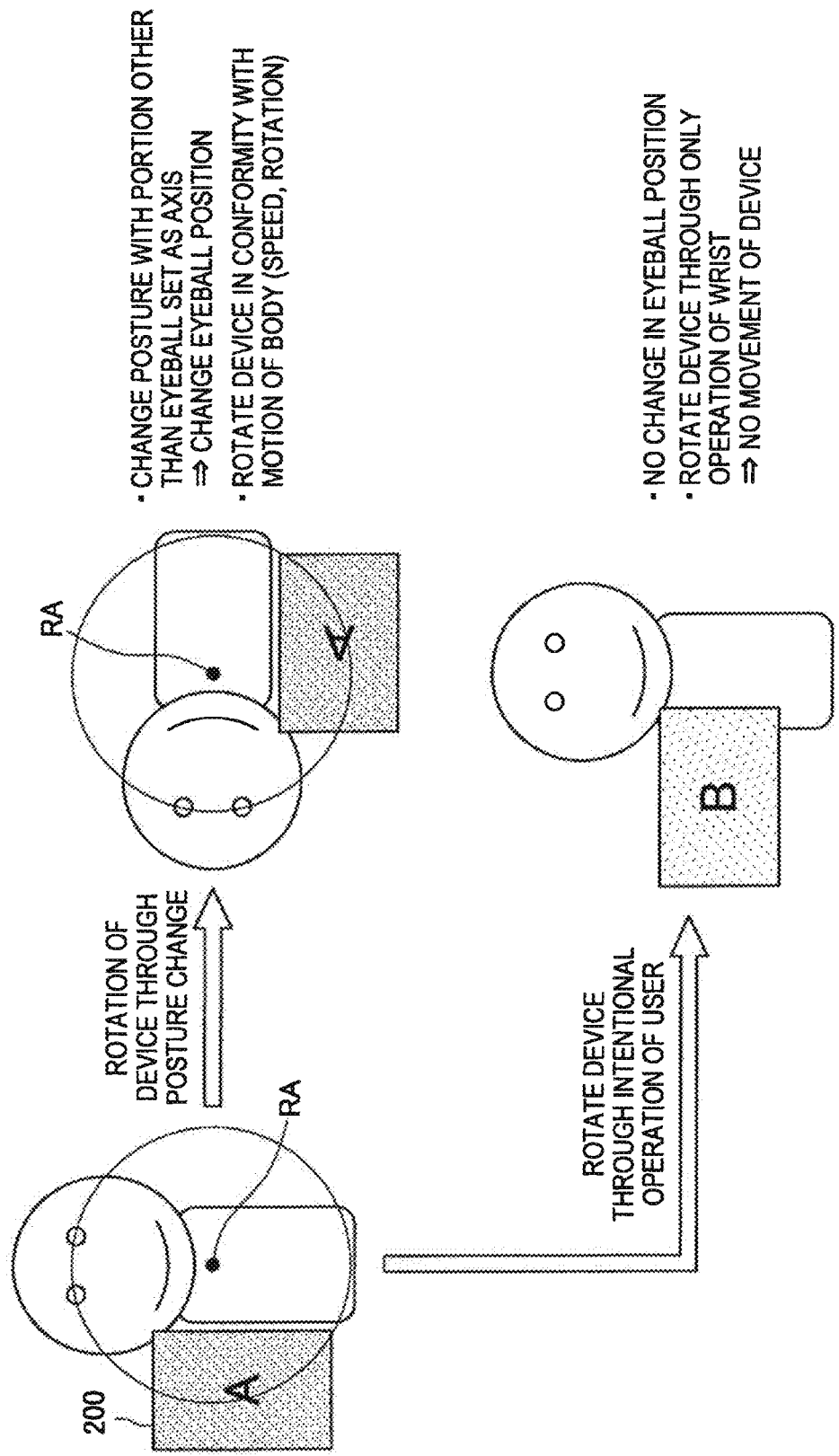
FIG. 5 is a view for explaining a difference in a movement of an eyeball position of a user between a screen rotation to be carried out by a posture change and a screen rotation to be carried out by an intentional operation.

With reference to FIG. 5, an insight will be given to a use case assumed in the present embodiment. FIG. 5 is a view for explaining a difference in a movement of an eyeball position of a user between a screen rotation to be carried out by a change in a posture and a screen rotation to be carried out by an intentional operation. A case in which the use rotates the device 200 is roughly divided into two parts. One of them is a rotation of the device 200 with the change in the posture of the user and the other is a rotation of the device 200 through the intentional operation.

In the former, the device 200 is rotated with the change in the posture of the user, and the user does not like an automatic screen rotation in many eases. At the same time, in the former, the user changes the posture by setting a portion other than the eyeball position as an axis (RA). Therefore, the device 200 is rotated and moved corresponding to the position or direction of the eyeball. On the other hand, in the latter, the user rotates the device 200 by only an operation of a wrist, for example, in a state in which the eyeball position is fixed. For this reason, the device 200 itself is not moved in many cases. In other words, there is a feature that the screen rotation to be carried out by the change in the posture and the screen rotation to be carried out by the intentional operation have a difference in the rotation axis RA and a rotating speed in the device 200 as well as a difference in an intention that the user wants to rotate the screen.

In the device 200 according to the present embodiment, therefore, the rotation setting time is regulated based on at least either the rotation axis RA or the rotating speed in the device 200, thereby enabling an easy execution of a cancel operation input of a screen layout change processing. With reference to FIGS. 6 to 12, detailed description will be given to a structure of the device 200 according to the present embodiment and a screen layout change processing based thereon and a cancel processing thereof. Detailed description of the same structures and functions as those of the device 100 according to the first embodiment will be omitted.

[2. 2. Hardware Structure]

Figure 6:
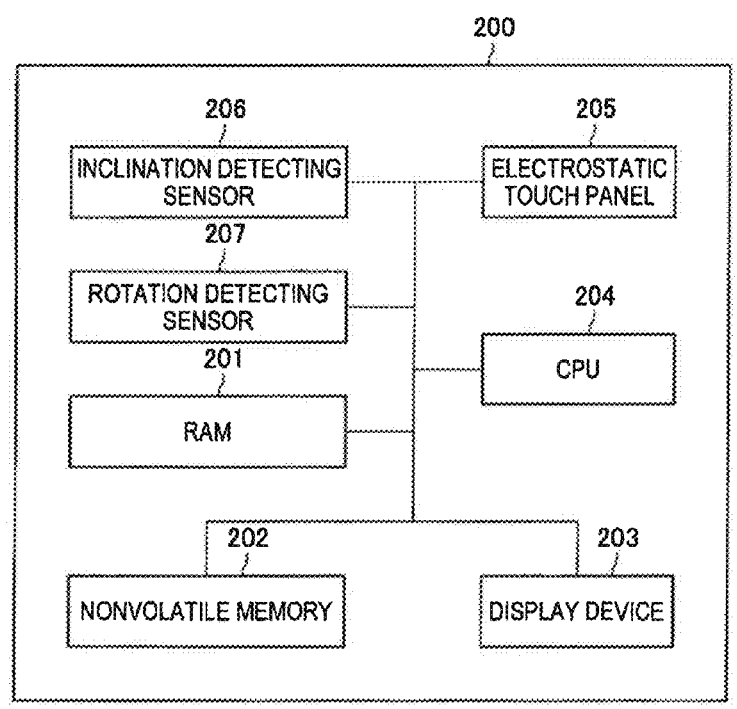
FIG. 6 is a diagram showing an example of a hardware structure of a device according to a second embodiment of the present disclosure.

First of all, a hardware structure of the device 200 according to the second embodiment of the present disclosure will be described with reference to FIG. 6. FIG. 6 is a diagram showing an example of the hardware structure of the device 200 according to the present embodiment.

As shown in FIG. 6, the device 200 according to the present embodiment includes memory (that is, non-transitory computer-readable medium), such as RAM 201, a nonvolatile memory 202, a display device 203, a CPU 204, an electrostatic touch panel 205, and an inclination detecting sensor 206 in the same manner as the device 100 illustrated in FIG. 1. The RAM 201, the nonvolatile memory 202, the display device 203, the CPU 204, the electrostatic touch panel 205 and the inclination detecting sensor 206 correspond to the RAM 101, the nonvolatile memory 102, the display device 103, the CPU 104, the electrostatic touch panel 105 and the inclination detecting sensor 106 in the first embodiment respectively, and have identical structures and functions with them. For this reason, detailed description will be omitted.

Moreover, the device 200 according to the present embodiment further includes a rotation detecting sensor 207 for detecting a rotating speed of the device 200 in addition to the devices described above. The rotation detecting sensor 207 is a sensor which can detect an angular velocity of the device 200, for example, a gyro sensor. By providing the rotation detecting sensor 207, it is possible to acquire the rotation axis RA or the rotating speed in the device 200.

[2. 3. Functional Structure]

Figure 7:
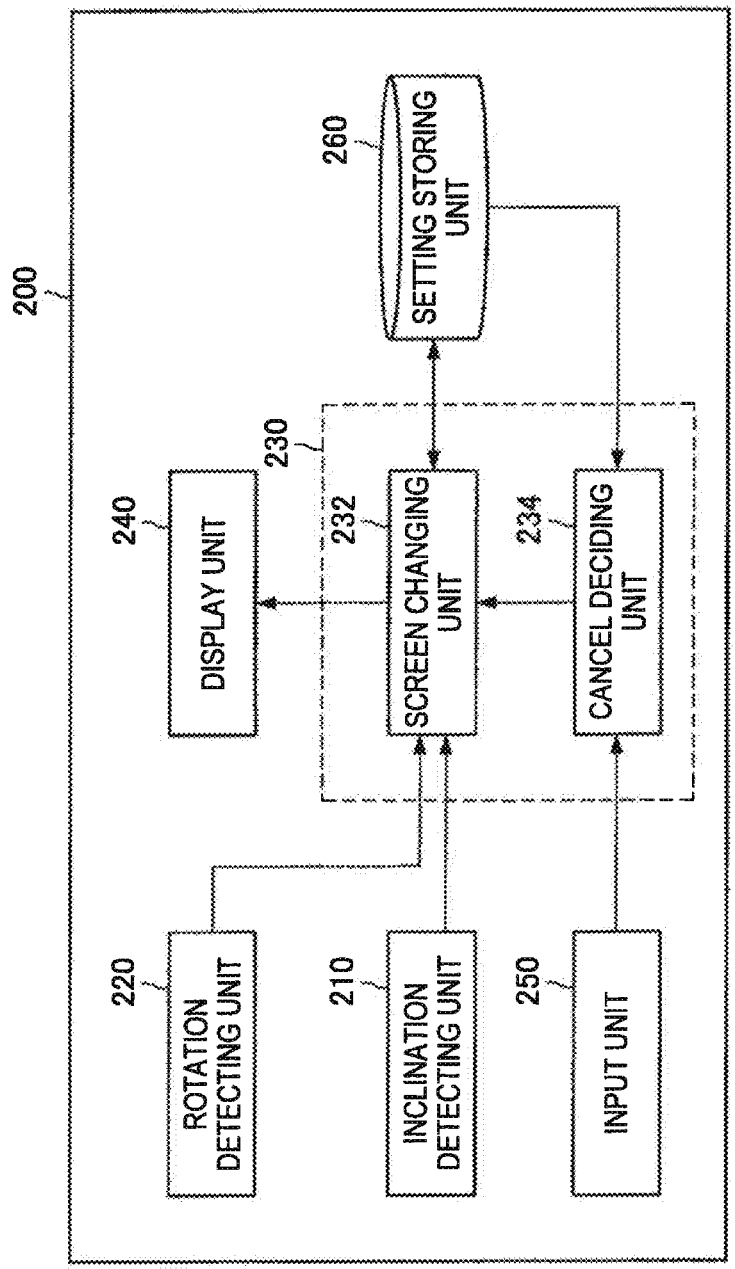
FIG. 7 is a functional block diagram showing a functional structure of the device according to the embodiment.

Next, the functional structure of the device 200 according to the present embodiment will be described with reference to FIG. 7. FIG. 7 is a functional block diagram showing the functional structure of the device 200 according to the present embodiment. In the same manner as FIG. 2, FIG. 7 also shows only functional units necessary for changing a screen layout of the display unit 130 and cancelling a screen layout change processing, and the device 200 itself can also include the other functional units. As shown in FIG. 7, the device 200 according to the present embodiment includes an inclination detecting unit 210, a rotation detecting unit 220, a display processing unit 230, a display unit 240, an input unit 250, and a setting storing unit 260.

The inclination detecting unit 210 serves to detect the inclination of the device 200 and corresponds to the inclination detecting sensor 206 in FIG. 6. The inclination detecting unit 210 functions in the same manner as the inclination detecting unit 110 according to the first embodiment, and inclination information of the device 200 which is detected by the inclination detecting unit 210 is output to the display processing unit 230.

The rotation detecting unit 220 is a sensor for detecting an angular velocity of the device 200 and corresponds to the rotation detecting sensor 207 in FIG. 6. By detecting the angular velocity of the device 200, it is also possible to acquire a position of the rotation axis RA of the device 200. The rotation detecting unit 220 outputs the angular velocity of the device 200 which is acquired to the display processing unit 230.

The display processing unit 230 is a functional section for changing a screen layout of information to be displayed on the display unit 240 which will be described below depending on the inclination of the device 200, and includes a screen changing unit 232 and a cancel deciding unit 234. The screen changing unit 232 decides a direction of the device 200 based on the inclination information of the device 200 which is detected by the inclination detecting unit 210 and displays information on the display unit 240 in a preset screen layout with respect to the direction of the device 200. The screen changing unit 232 can acquire setting information about the screen layout depending on the direction of the device 200 from the setting storing unit 260 which will be described below.

Moreover, the screen changing unit 232 regulates the rotation setting time of the screen layout change processing based on the angular velocity of the device 200 acquired by the rotation detecting unit 220. The screen changing unit 232 is configured to receive a signal representing the angular velocity detected by the rotation detecting unit 220. The image changing unit 232 can acquire the rotation axis RA or the rotating speed in the device 200 from the angular velocity of the device 200. As described above, the position of the rotation axis RA or the rotating speed in the device 200 is varied depending on whether the device 200 is rotated by the change in the posture of the user or the internal operation. Therefore, the screen changing unit 232 analyzes the situation in which the device 200 is rotated based on a result of the detection which is obtained by the rotation detecting unit 220 and regulates the rotation setting time depending on the situation thus analyzed, thereby enabling an easy execution of the cancel operation input of the screen layout change processing. The details of the processing for regulating the rotation setting time will be described below.

The cancel deciding unit 234 cancels the screen layout change processing which is being carried out by the screen changing unit 232 based on an operation input from the input unit 250 which will be described below. The cancel deciding unit 234 can be configured to function in the same manner as the cancel deciding unit 124 according to the first embodiment.

The display unit 240 is an output section for displaying information and corresponds to the display device 203 in FIG. 6, and can have the same structure as that of the display unit 130 according to the first embodiment. The screen layout of the information to be displayed on the display unit 240 is determined depending on the inclination of the device 200 by means of the screen changing unit 232.

The input unit 250 is a functional section for receiving the operation input from the user, and corresponds to the electrostatic touch panel 205 in FIG. 6, for example, and can have the same structure as that of the input unit 140 according to the first embodiment. The input unit 250 according to the present embodiment can also include an input device such as a hardware button in addition to the electrostatic touch panel 205. The operation input from the input unit 250 is output to at least one functional section for carrying out an information processing in the device 200 as operation input information. For example, the input operation from the input unit 250 is output to the cancel deciding unit 234, and the cancel deciding unit 234 analyzes the operation input to decide whether the screen layout change processing being carried out by the screen changing unit 232 is to be cancelled or not.

The setting storing unit 260 serves as a storing section for storing necessary information for an information processing in the device 200, and corresponds to the RAM 201 or the nonvolatile memory 202 in FIG. 6 and can have the same structure as that of the setting storing unit 150 according to the first embodiment. The setting storing unit 260 stores information about a correspondence relationship between the inclination of the device 200 based on the result of the detection which is obtained by the inclination detecting unit 210 and the screen layout of the information to be displayed on the display unit 240, a cancel operation input for cancelling the screen layout change processing and the like, for example. Moreover, the setting storing unit 260 stores the relationship between the position of the rotation axis RA of the device 200 and the weight of the rotation setting time or the relationship between the rotating speed of the device 200 and the weight of the rotation setting time. The information to be stored in the setting storing unit 260 may be stored in advance or set by the user.

[2. 4. Regulation of Rotation Setting Time]

The device 200 according to the present embodiment regulates to increase or reduce the rotation setting time for defining a period for which the screen layout change processing can be cancelled based on the result of the detection which is obtained by the rotation detecting unit 220.

(Setting of Rotation Setting Time depending on Rotating Axis of Device)

Figure 9:
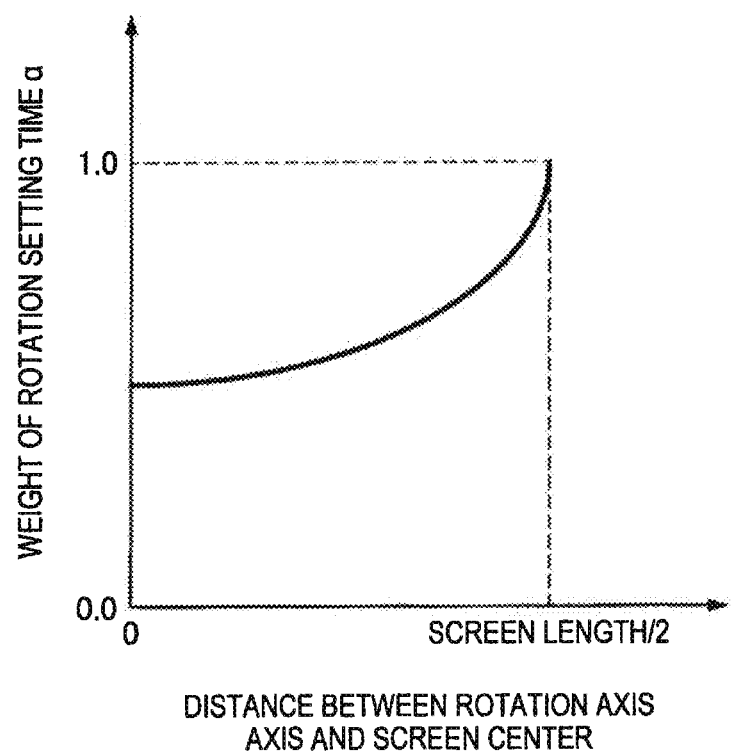
FIG. 9 is a graph representing a relationship between a distance between a rotation axis and a center of a screen, and a weight of a rotation setting time.

First of all, an operation for setting the rotation setting time depending on the rotation axis RA of the device 200 will be described with reference to FIGS. 8 and 9. FIG. 8 is a view for explaining the operation for setting the rotation setting time depending on the rotation axis RA of the device 200. FIG. 9 is a graph representing a relationship between a distance between the rotation axis RA and a screen center and a weight $\alpha$ of the rotation setting time.

In the case in which the device 200 is rotated by changing the posture of the user, the eyeball position or the head portion is moved corresponding to the device 200 as described with reference to FIG. 5. Therefore, an end point of the device 200 serves as the rotation axis RA in conformity with the motion of the user as shown in FIG. 8. In other words, in the case in which the end point of the device 200 serves as the rotation axis RA, it can be presumed that the device 200 is rotated by the change in the posture of the user. In this case, a long time may be taken for changing the posture of the user, and there is a high possibility that the screen layout might not be changed. Therefore, the rotation setting time can be set to be a longer than a preset initial rotation setting time. Consequently, it is possible to sufficiently take a time for cancelling the screen layout change processing after changing the posture for the user. Thus, it is possible to easily carry out the cancel operation input.

On the other hand, in the case in which the device 200 is rotated by an intentional operation, the position of the eyeball or the position of the head portion in the rotation of the device 200 is rarely changed as described with reference to FIG. 5 and the center of the device 200 serves as the rotation axis RA. In other words, in the case in which the center of the device 200 serves as the rotation axis RA, it can be presumed that the device 200 is rotated by the intentional operation. The rotation of the device 200 by the intentional operation of the user causes a high possibility that information might be displayed in a preset screen layout depending on the inclination of the device 200. In this case, accordingly, the rotation setting time is set to be shorter than the preset initial rotation setting time so that the rotation of the screen layout intended by the user can be carried out quickly.

FIG. 9 shows an example of the regulation of the rotation setting time depending on the rotation axis RA of the device 200. In FIG. 9, the relationship between the situation of the device 200 and the rotation axis RA is grasped by a distance between the position of the rotation axis RA and the position of the screen center (a distance between the rotation axis and the screen center). The distance between the rotation axis and the screen center is equivalent to a distance between the end point of the device 200 and the position of the screen center because the rotation axis RA is present on the end point of the device 200 in the case in which the device 200 is rotated through the change in the posture of the user in FIG. 8. In the case in which the device 200 is rotated by the intentional operation in FIG. 8, moreover, the rotation axis RA is present in the position of the screen center. Therefore, the distance between the rotation axis and the screen center is almost zero. Consequently, it can be presumed that the device 200 is rotated through the change in the posture of the user when the distance between the rotation axis and the screen center is large, and that the device 200 is rotated by the intentional operation when the distance between the rotation axis and the screen center is small and close to zero.

The weight α of the rotation setting time with respect to the distance between the rotation axis and the screen center is set to be α=0.5 when the distance between the rotation axis and the screen center is zero and to be α=1.0 when the distance between the rotation axis and the screen center is a half of a screen length as shown in FIG. 9, for example. Thus, the weight α can be set to be increased exponentially. FIG. 9 shows an example, and the weight α of the rotation setting time with respect to the distance between the rotation axis and the screen center can be set properly to be increased with an increase in the distance between the rotation axis and the screen center in the present technique. A value obtained by multiplying the weight α of the acquired rotation setting time by the initial rotation setting time is set to be the rotation setting time so that the rotation setting time depending on the position of the rotation axis RA can be set.

(Setting of Rotation Setting Time depending on Rotating Speed of Device)

Figure 11:
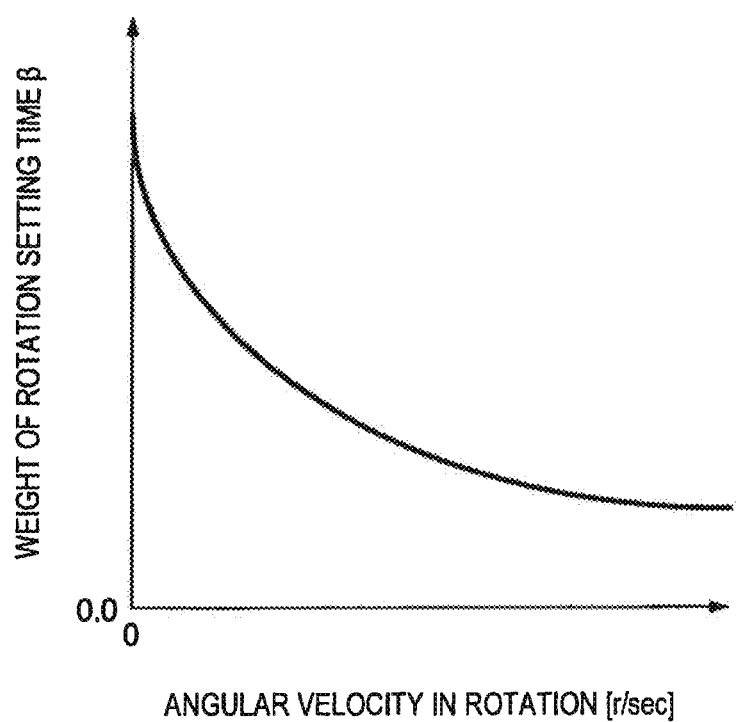
FIG. 11 is a graph representing a relationship between an angular velocity in a rotation of the device and a weight β of a rotation setting time.

Next, an operation for setting the rotation setting time depending on the rotating speed of the device 200 will be described with reference to FIGS. 10 and 11. FIG. 10 is a view for explaining the operation for setting the rotation setting time depending on the rotating speed of the device 200. FIG. 11 is a graph representing a relationship between an angular velocity in the rotation of the device 200 and a weight β of the rotation setting time.

In the case in which the device 200 is rotated through the change in the posture of the user, the device 200 is rotated in conformity with the motion of the body of the user as described with reference to FIG. 5. Therefore, it can be presumed that the rotating speed of the device 200 is comparatively low as shown in FIG. 10. In other words, in the case in which the rotating speed of the device 200 is lower than a predetermined reference rotating speed, it is supposed that there is a high possibility that the user might not intend the rotation of the screen layout. For this reason, the rotation setting time is set to be a little longer than the preset initial rotation setting time. Consequently, it is possible to sufficiently take a time for cancelling the screen layout change processing after the change in the posture for the user. Thus, it is possible to easily carry out a cancel operation input.

On the other hand, in the case in which the device 200 is rotated by the intentional operation, the device 200 is rotated by means of a wrist or the like as described with reference to FIG. 5, and furthermore, the intended operation is carried out. Therefore, the rotating speed is comparatively high. In other words, in the case in which the rotating speed of the device 200 is higher than a reference rotating speed, there is a high possibility that the user might intend the rotation of the screen layout. Therefore, the rotation setting time is set to be a shorter than the preset initial rotation setting time. Consequently, the rotation of the screen layout intended by the user can be carried out quickly.

The reference rotating speed is preset to enable an identification of the use situation of the device 200 from the rotating speed of the device 200. For example, it is also possible to previously acquire a plurality of rotating speeds in the rotation of the device 200 by the change in the posture of the user and a plurality of rotating speeds in the rotation of the device 200 by the intentional operation, thereby setting a mean value thereof as the reference rotating speed.

FIG. 11 shows an example of the regulation of the rotation setting time depending on the angular velocity in the rotation of the device 200. As described with reference to FIG. 10, it can be presumed that the device 200 is rotated through the change in the posture of the user when the rotating speed (angular velocity) of the device 200 is lower, and that the device 200 is rotated by the intentional operation when the rotating speed (angular velocity) of the device 200 is higher.

The weight β of the rotation setting time with respect to the angular velocity in the rotation of the device 200 can be set to be decreased exponentially and to approximate to zero when the angular velocity is increased as shown in FIG. 11, for example. FIG. 11 shows an example, and the weight β of the rotation setting time with respect to the angular velocity in the rotation of the device 200 can be properly set to be decreased when the angular velocity in the rotation of the device 200 is increased in the present technique. By setting, as the rotation setting time, a value obtained by multiplying the weight β of the rotation setting time thus acquired by the initial rotation setting time, it is possible to set the rotation setting time depending on the rotating speed of the device 200.

In the device 200 according to the present embodiment, thus, it is possible to regulate the rotation setting time depending on the using situation of the device 200. As a matter of course, the rotation setting time may be regulated based on the position of the rotation axis RA and the rotating speed in the device 200. In this case, the rotation setting time can be set to have a value obtained by multiplying the initial rotation setting time by the weights α and β, for example.

[2. 5. Screen Layout Change Processing and Cancel Processing Thereof]

Figure 12:
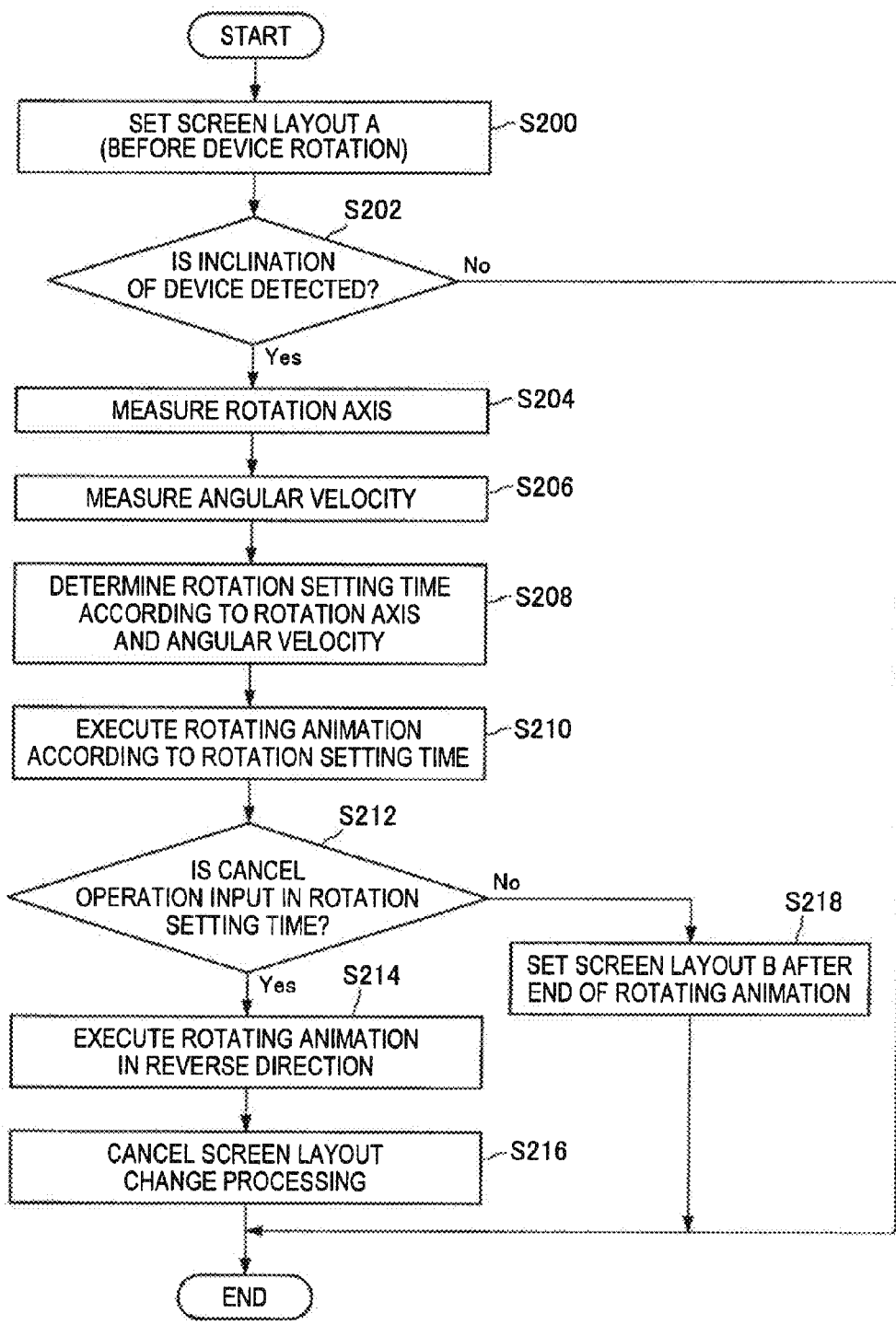
FIG. 12 is a flow chart showing a screen layout change processing and a cancel processing thereof in the device according to the embodiment.
Figure 13:
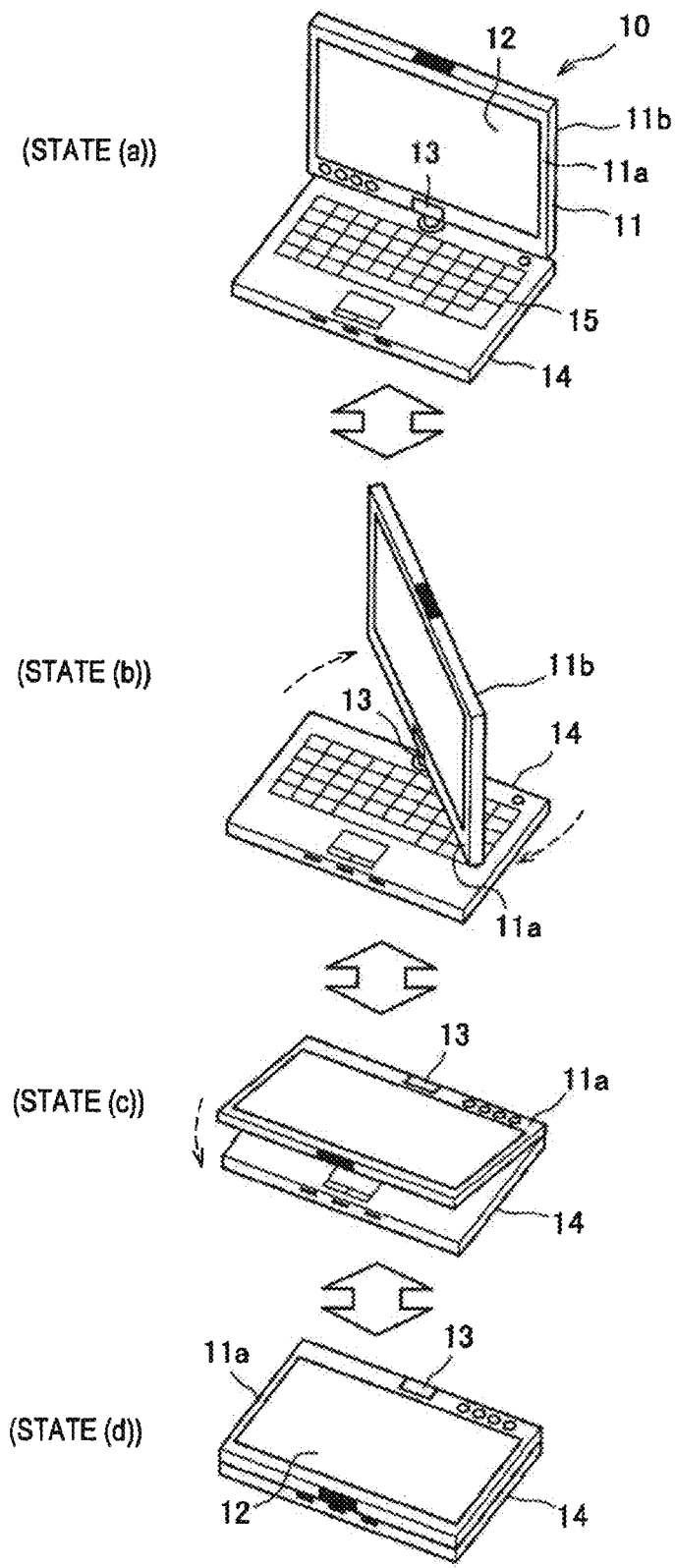
FIG. 13 is an explanatory view showing a structure of a tablet PC according to the related art of the present disclosure.
Figure 14:
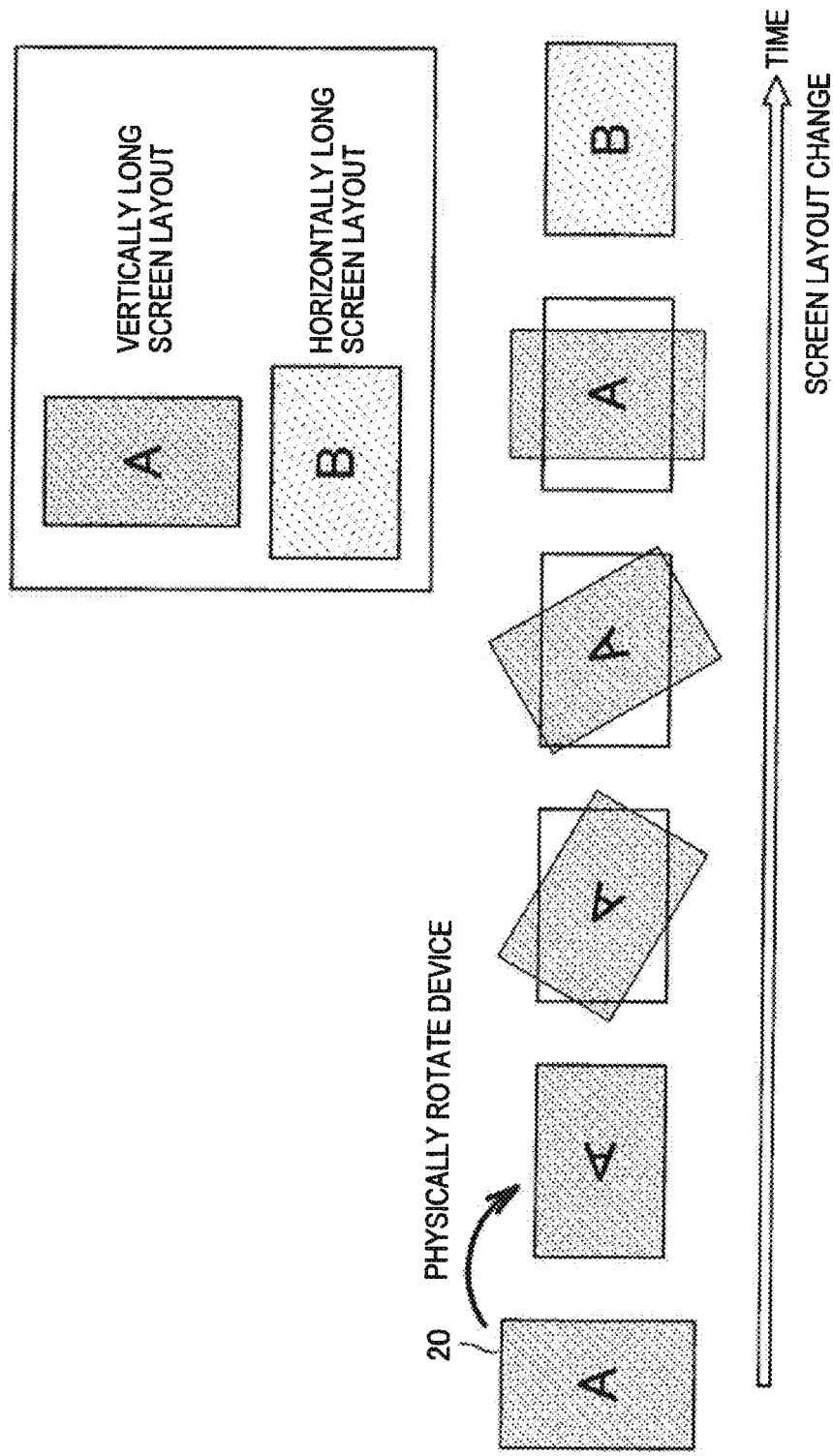
FIG. 14 is a view for explaining an automatic change in a screen layout depending on an inclination of the device.
Figure 15:
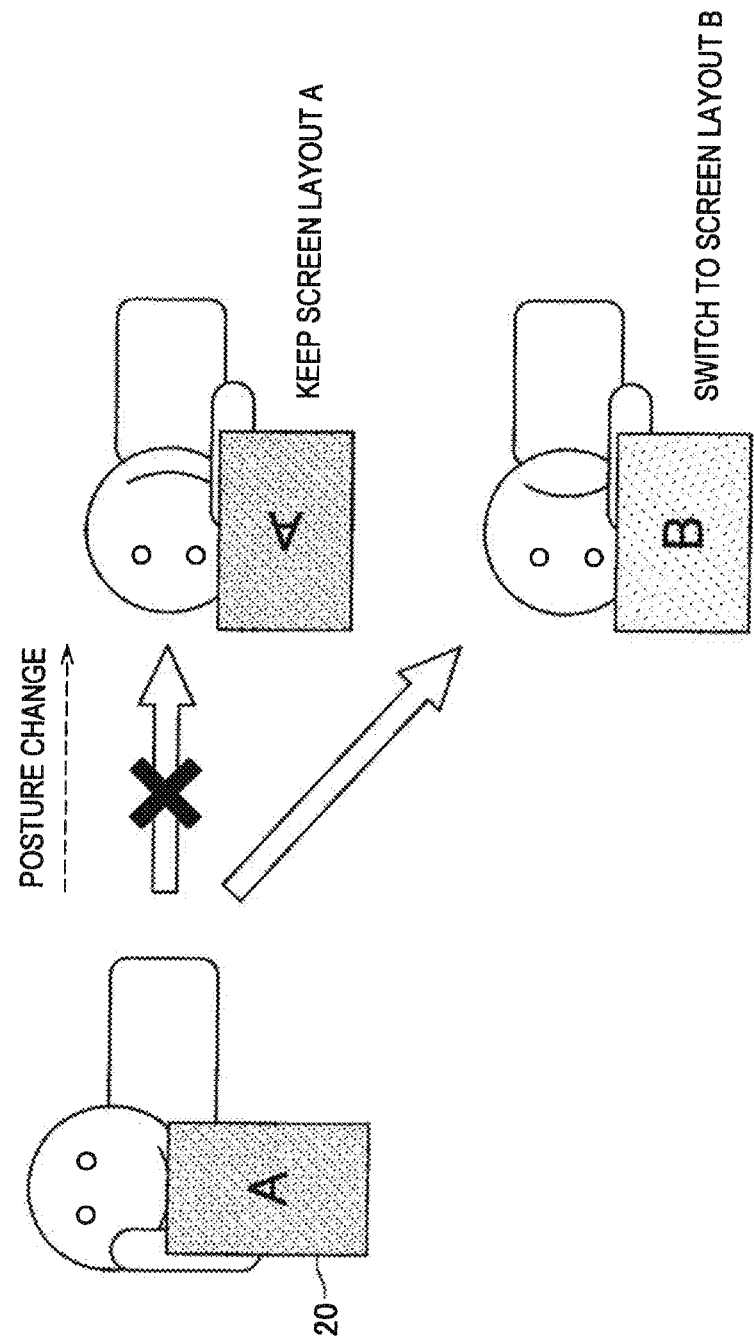
FIG. 15 is a view for explaining a relationship between a change in a posture of a user and a change in the screen layout depending on the inclination of the device.
Figure 16:
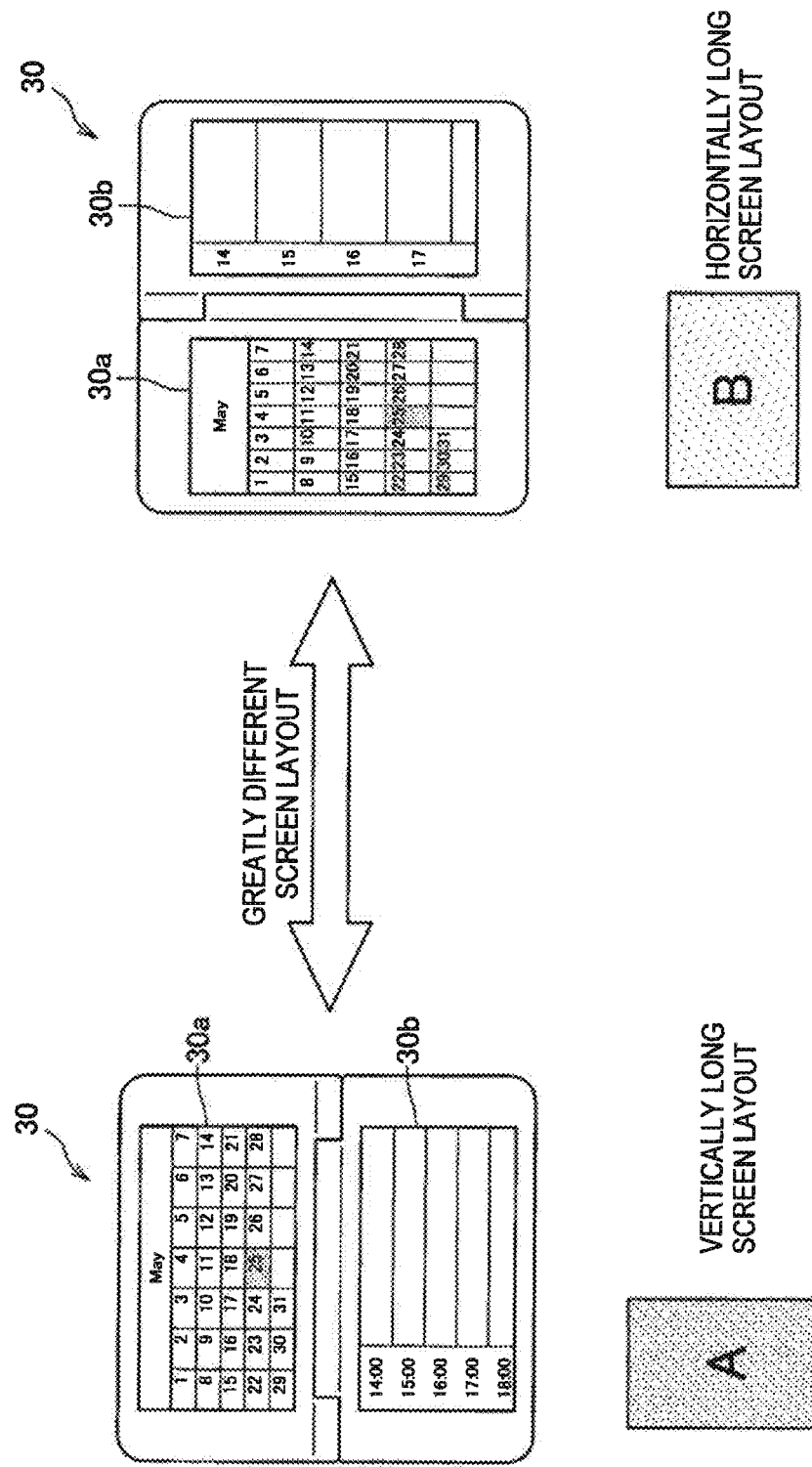
FIG. 16 is a view for explaining an example of a change in a screen layout in a two-screen device.

With reference to FIG. 12, the screen layout change processing and the cancel processing thereof which are to be carried out by the device 200 according to the present embodiment will be described below. FIG. 12 is a flow chart showing the screen layout change processing and the cancel processing thereof in the device 200 according to the present embodiment.

Description will be given to the case in which the same screen layout change processing as that in FIG. 3 which is used in the explanation of the first embodiment is carried out. In other words, it is assumed that information is displayed in a screen layout A in the display unit 240 when the screen of the display unit 240 is vertically long (a first direction of a screen), and information is displayed in a screen layout B in the display unit 240 when the screen of the display unit 240 is horizontally long (a second direction of a screen).

First of all, it is assumed that the information is displayed in the screen layout A when the screen of the display unit 240 has the first direction of the screen as a state brought before the rotation of the device 200 (S200). In the present embodiment, as described above, the information is displayed in the screen layout A with the first direction of the screen (the vertically long screen), and the information is displayed in the screen layout B with the second direction of the screen (the horizontally long screen). This setting is preset to the setting storing unit 260.

Subsequently, the screen changing unit 232 decides the inclination of the device 200 based on the result of the detection obtained by the inclination detecting unit 210 (S202). The processing of the Step S202 can be carried out in the same manner as the Step S102 in FIG. 4, and an acceleration sensor for detecting a gravitational acceleration can be used for the inclination detecting unit 210, for example. The screen changing unit 232 decides the necessity for changing the screen layout of the display unit 240 through the inclination of the device 200 which is acquired. The decision can also be made in the same manner as in the Step S102 of FIG. 4.

When it is decided that a change from the screen layout A to the screen layout B is not necessary depending on the inclination of the device 200 based on the deciding condition, the screen changing unit 232 ends the processing without changing the screen layout and repeats the processing after the Step S200. On the other hand, when it is decided that the change from the screen layout A to the screen layout B is necessary depending on the inclination of the device 200, the screen changing unit 232 starts a screen layout change processing for changing the screen layout of the display unit 240. In the present embodiment, the measurement of the rotation axis RA (S204) and the measurement of the angular velocity (S206) in the device 200 are previously carried out.

At the Steps S204 and S206, the screen changing unit 232 acquires the rotation axis RA and the angular velocity in the device 200 based on the result of the detection which is obtained by the rotation detecting unit 220. The rotation axis RA and the angular velocity in the device 200 can be calculated by the technique described above. Any of the Steps S204 and S206 may be executed earlier. The screen changing unit 232 determines the rotation setting time based on the position of the rotation axis RA of the device 200 which is acquired at the Step S204 and the angular velocity of the device 200 which is acquired at the Step S206 (S208).

The rotation setting time is determined through the multiplication of the preset initial rotation setting time by the weight α based on the position of the rotation axis RA of the device 200 and the weight β based on the angular velocity of the device 200 as described above, for example. Although FIG. 12 shows the case in which the rotation setting time is determined based on the position of the rotation axis RA and the angular velocity in the device, the present technique is not restricted to the example. For instance, the screen changing unit 232 may determine the rotation setting time based on at least one of the position of the rotation axis RA and the angular velocity in the device 200. At this time, in the case in which either the position of the rotation axis RA or the angular velocity in the device 200 is not used for determining the rotation setting time, the processing of the Step S204 or S206 for acquiring the information does not need to be executed.

When the rotation setting time is determined at the Step S208, the screen changing unit 232 executes a rotating animation of the screen layout depending on the rotation setting time (S210). The rotating animation indicates to rotate the screen layout displayed in a different state from a preset state, thereby rotating the screen layout in a predetermined change rotating direction so as to be displayed in the preset state. The rotating animation may be an animation for rotating the screen layout in the change rotating direction in the rotation setting time. Consequently, the user can recognize that the screen layout change processing can be cancelled while rotating animation is executed.

The rotation setting time is counted after the rotation of the device 200 is detected so that the rotating animation is executed. During the rotation setting time, the user can cancel the screen layout change processing by carrying out a cancel operation input as described above. Herein, the rotation setting time is regulated through the Steps S204 to S208. Consequently, the time differs depending on whether the device 200 is rotated by the change in the posture of the user or the intentional operation. In the case in which it is presumed that the device 200 is rotated by the change in the posture of the user, there is also a possibility that the screen layout might not be changed. Therefore, the rotation setting time is set to be longer. On the other hand, when the device 200 is rotated by the intentional operation of the user, there is a high possibility that the screen layout might be changed. For this reason, the rotation setting time is set to be shorter in order to quickly carry out the screen rotation.

The cancel deciding unit 234 detects whether the cancel operation input is sent from the input unit 250 or not (S212). The cancel operation input can be set to be an operation for touching a screen with an operation member such as a finger or a touch pen by the user, an operation for touching the screen with the operation member to carry out dragging in a reverse direction to the change rotating direction, or the like in the same manner as in the first embodiment, for example. When the cancel operation input is received, the cancel deciding unit 234 outputs, to the screen changing unit 232, an instruction for cancelling the screen layout change processing which is being executed.

During the rotation setting time, an operation input to applications is blocked to avoid a conflict with an existing operation in the same manner as in the first embodiment. The operation input to all of the applications does not need to be blocked but it is sufficient to block at least only an operation input conflicting with the cancel operation input of the screen layout change processing.

The screen changing unit 232 receiving an instruction for cancelling the screen layout change processing executes a rotating animation in a reverse direction to the change rotating direction in order to give the user a notice of an acceptance of the cancel of the screen layout change processing (S214). Consequently, the screen changing unit 232 reverses the direction of the screen layout A of the rotating animation, thereby bringing the state A in which the screen layout A is displayed on the horizontally long screen as shown in FIG. 3. When the state A is brought, then, the screen layout change processing is cancelled (S216) and the processing of FIG. 12 is thereafter ended, and the processing from the Step S200 is started again.

On the other hand, in the case in which the cancel operation input is not received within the rotation setting time at the Step S212, the screen layout change processing is exactly executed so that the screen changing unit 232 displays information in the screen layout B after the elapse of the rotation setting time, that is, the end of the rotating animation.

The above description has been given to the structure of the device 200 according to the second embodiment of the present disclosure and the screen layout change processing depending on the inclination of the device 200 and the cancel processing thereof based on the structure. According to the present embodiment, when the screen layout is to be automatically changed depending on the inclination of the device 200, the time (the rotation setting time) is provided till the display change from the unchanged screen layout to the changed screen layout. The rotation setting time is set based on the position of the rotation axis RA or the angular velocity (rotating speed) in the device 200. When the cancel operation input is received in the rotation setting time, the screen changing unit 232 returns the screen layout into the state brought before the screen layout change (the state A in FIG. 3), immediately after the device 200 is inclined.

Consequently, it is possible to usually change the screen layout automatically depending on the inclination of the device 200. Therefore, it is possible to omit a great deal of time and labor for setting the screen layout by the user. On the other hand, in the case in which the user does not demand to change the screen layout, it is possible to easily cancel the screen layout change processing by carrying out the cancel operation input. Accordingly, the user can readily determine the screen layout depending on the use configuration of the device 200. By setting the rotation setting time based on the position of the rotation axis RA or the angular velocity in the device 200, moreover, it is possible to easily carry out the cancel operation input of the screen layout change processing or to quickly perform the change in the screen layout depending on the using situation of the device 200.

It should be understood by those skilled in the art that various changes, combinations, sub-combinations and alterations may occur depending on design requirements and other factors insofar as they are within the scope of the appended claims or the equivalents thereof.

For example, in the embodiments, the rotating animation is executed to give a notice of the rotation setting time. However, the present technique is not restricted to the example. For instance, a dialog for giving the notice of the rotation setting time may be displayed on the display unit or a predetermined sound may be output for the rotation setting time in place of the execution of the rotating animation. In order to give a notice of the rotation setting time, alternatively, it is also possible to fade out an unchanged screen layout, thereby executing an animation for displaying a changed screen layout after the end of the rotation setting time.

It is not absolutely necessary to execute a processing for giving a notice of a rotation setting time such as the rotating animation. For example, the screen changing unit may change the screen layout after the elapse of the rotation setting time without changing the screen layout before the elapse of the rotation setting time after the rotation of the device.

Additionally, the present technology may also be configured as below.

(1)
An information processing device comprising:
an inclination detection unit configured to generate a first signal regarding inclination of the device; and
a display processing unit configured to:
based on the first signal, generate a second signal to initiate a change in orientation of a display of content; and
generate a third signal to cancel the change in orientation in response to receipt of a CANCEL command after initiation of the change.

(2)
The device according to (1), further comprising:
a display unit configured to display the content.

(3)
The device according to (1) or (2), wherein the display processing unit is configured to generate the third signal during the change.

(4)
The device according to any of (1) to (3), wherein the device is configured to block, after initiation of the change, an operation input to an application.

(5)
The device according to any of (1) to (4), wherein the device is configured to block an operation input conflicting with the CANCEL command.

(6)
The device according to any of (1) to (5), further comprising: a rotation detection unit configured to detect an angular velocity of the device, and; communicate with the display processing unit.

(7)
The device according to any of (1) to (6), wherein the display processing unit comprises: a screen changing unit configured to: receive a signal representing an angular velocity detected by the rotation detection unit; and control a rotation setting time of the change based on one of a position of a rotation axis or a rotating speed of the device acquired from an angular velocity detected by the rotation detection unit.

(8)
The device according to (7), wherein the screen changing unit is configured to modify the rotation setting time based on the position of the rotation axis of the device.

(9)
The device according to (7) or (8), wherein the screen changing unit is configured to decrease the rotation setting time when a distance between the rotation axis and a center of a screen of the device decreases.

(10)

The device according to any of (7) to (9), wherein the screen changing unit is configured to decrease the rotation setting time by a factor that decreases exponentially as a distance between the rotation axis and a center of a screen of the device decreases.

(11)

The device according to any of (7) to (10), wherein the screen changing unit is configured to adjust the rotation setting time corresponding to a factor multiplied by a preset initial rotation setting time, wherein the factor decreases as a distance between the rotation axis and a center of a screen of the device decreases.

(12)

The device according to any of (7) to (11), wherein the screen changing unit is configured to regulate the rotation setting time based on the rotating speed of the device.

(13)

The device according to any of (7) to (12), wherein the screen changing unit is configured to decrease the rotation setting time when the rotating speed of the device increases.

(14)

The device according to any of (7) to (13), wherein the screen changing unit is configured to decrease the rotation setting time by a factor that decreases exponentially as the rotating speed of the device increases.

(15)

The device according to any of (7) to (14), wherein the screen changing unit is configured to increase the rotation setting time when the rotating speed of the device is less than a predetermined reference rotating speed.

(16)

The device according to any of (7) to (15), wherein the screen changing unit is configured to adjust the rotation setting time to correspond to a factor multiplied by a preset initial rotation setting time, where the factor decreases as the rotating speed of the device increases.

(17)

The device according to (16), wherein the factor approaches zero as the rotating speed of the device increases.

(18)

The device according to any of (7) to (16), wherein the rotation detection unit communicates with the screen changing unit.

(19)

A method of adjusting a screen orientation of an item of content displayed on an information processing device, comprising:

generating a first signal corresponding to inclination of the device;

generating a second signal, based on the first signal, to initiate a change in orientation of a display of the item of content;

generating a third signal to cancel the change in orientation in response to receipt of a CANCEL command after initiation of the change; and displaying the item of content.

(20)

A non-transitory computer-readable medium comprising a program for causing a computer to function as:

a unit for generating a first signal corresponding to inclination of the device;

a unit for generating a second signal, based on the first signal, to initiate a change in orientation of a display of an item of content;

a unit for generating a third signal to cancel the change in orientation in response to receipt of a CANCEL command after initiation of the change; and a unit for displaying the item of content.

Furthermore, the present technology may also be configured as below.

(1)

An information processing apparatus comprising:

an inclination detecting unit detecting an inclination of a device;

a screen changing unit changing a screen layout of information to be displayed on a display unit of the device based on a result of the detection which is obtained by the inclination detecting unit; and a cancel deciding unit deciding a presence of a cancel operation input to cancel a screen layout change processing depending on the inclination of the device, wherein when it is decided by the cancel deciding unit that the cancel operation input is present within a change processing time in which the screen layout change processing depending on the inclination of the device is to be carried cut after starting the screen layout change processing, the screen changing unit cancels the screen layout change processing.

(2)

The information processing apparatus according to (1), wherein a processing based on an operation input conflicting with a cancel operation input of the screen layout change processing is not executed during the change processing time.

(3)

The information processing apparatus according to any one of (1) or (2), further comprising:

a rotation detecting unit detecting a rotating speed of the device, wherein the screen changing unit setting the change processing time based on at least one of a rotation center position of the device and an angular velocity of the device which are acquired from the result of the detection of the rotation detecting unit.

(4)

The information processing apparatus according to (3), wherein the screen changing unit shortens the change processing time more greatly if the rotation center position of the device is closer to the center position of the device.

(5)

The information processing apparatus according to any one of (3) or (4), wherein the screen changing unit shortens the change processing time more greatly if the angular velocity of the device is larger.

It should be understood that embodiments of the present technology are not limited to the embodiment described above, and various alterations may occur within the scope of the substance of the present technology. Further, it should be understood that, as used herein, the indefinite articles "a" and "an" mean "one or more" in open-ended claims containing the transitional phrase "comprising," "including," and/or "having."

What is claimed is:

1. An information processing device comprising:

an inclination detection unit configured to detect inclination of the device; and a display processing unit configured to:

initiate, when the detected inclination of the device is at least at or over a threshold angle, a change in orientation of a display of content; and cancel the change in orientation in response to receipt of a CANCEL command received during a period of time after initiation of the change, wherein the period of time is a predetermined period of time for the change in orientation of the display of the content to be completed, and wherein the inclination detection unit and the display processing unit are each implemented via at least one processor.

2. The information processing device according to claim 1, further comprising:

a rotation detection unit configured to detect an angular velocity of the device, and communicate with the display processing unit, wherein the rotation detection unit is implemented via at least one processor.

3. The information processing device according to claim 2, wherein the period of time is determined in accordance with a result of detecting the angular velocity by the rotation detection unit.

4. The information processing device according to claim 2, wherein the display processing unit determines whether the device is rotated intentionally or not in accordance with the angular velocity detected by the rotation detection unit.

5. The information processing device according to claim 1, wherein the threshold angle is 90 degrees.

6. The information processing device according to claim 1, wherein the display processing unit is further configured to display an animation during the period of time after initiation of the change.

7. An information processing method comprising:

detecting an inclination of a device;

initiating, when the detected inclination of the device is at least at or over a threshold angle, a change in orientation of a display of content; and canceling the change in orientation in response to receipt of a CANCEL command received during a period of time after initiation of the change, wherein the period of time is a predetermined period of time for the change in orientation of the display of the content to be completed.

8. The information processing method according to claim 7, further comprising:

detecting an angular velocity of the device.

9. The information processing method according to claim 8, wherein the period of time is determined in accordance with a result of detecting the angular velocity.

10. The information processing method according to claim 8, further comprising:

determining whether the device is rotated intentionally or not in accordance with the detected angular velocity.

11. A non-transitory computer-readable medium having embodied thereon a program, which when executed by a computer causes the computer to execute an information processing method, the method comprising:

detecting an inclination of a device;

initiating, when the detected inclination of the device is at least at or over a threshold angle, a change in orientation of a display of content; and canceling the change in orientation in response to receipt of a CANCEL command received during a period of time after initiation of the change, wherein the period of time is a predetermined period of time for the change in orientation of the display of the content to be completed.

* * * * *